United States Patent [19]
Rocci et al.

[11] Patent Number: 5,760,332
[45] Date of Patent: *Jun. 2, 1998

[54] CABLE SPLICE PROTECTOR

[75] Inventors: Joseph Rocci, Burr Ridge; David W. Kirby, Lemont, both of Ill.

[73] Assignee: Etcon Corporation, Burr Ridge, Ill.

[*] Notice: The term of this patent shall not extend beyond the expiration date of Pat. No. 5,502,280.

[21] Appl. No.: 617,563

[22] Filed: Mar. 19, 1996

Related U.S. Application Data

[63] Continuation-in-part of Ser. No. 335,111, Nov. 7, 1994, Pat. No. 5,502,280, which is a continuation of Ser. No. 100,672, Jul. 30, 1993, abandoned.

[51] Int. Cl.⁶ .......................... H01R 4/00; H01R 13/52
[52] U.S. Cl. .................. 174/84 R; 174/84 S; 439/271
[58] Field of Search .................. 174/84 R, 85, 174/86, 84 S, 88 R; 439/271, 274, 275

[56] References Cited

U.S. PATENT DOCUMENTS

| | | | |
|---|---|---|---|
| 457,865 | 8/1891 | Manson . | |
| 707,055 | 8/1902 | Earl | 174/91 X |
| 1,718,817 | 6/1929 | Greene | 174/89 X |
| 2,188,755 | 1/1940 | Markuson | 57/6 X |
| 3,041,575 | 6/1962 | Schneider | 439/393 X |
| 3,854,003 | 12/1974 | Dret | 174/88 C X |
| 3,944,317 | 3/1976 | Oberdiear | 439/610 X |
| 4,484,022 | 11/1984 | Eilentropp | 174/84 R |
| 4,558,173 | 12/1985 | Gajajiva et al. | 174/86 |
| 4,684,764 | 8/1987 | Luzzi et al. | 174/91 X |
| 5,502,280 | 3/1996 | Rocci et al. | 178/84 R |
| 5,606,150 | 2/1997 | Radliff et al. | 174/92 X |
| 5,626,490 | 5/1997 | Pitts et al. | 439/404 X |

*Primary Examiner*—Kristine L. Kincaid
*Assistant Examiner*—Chau N. Nguyen
*Attorney, Agent, or Firm*—Banner & Witcoff, Ltd

[57] ABSTRACT

An enclosure for protecting cable splices having a pair of outer shells, a pair of inner shells, an extender between the pairs of inner and outer shells, and clips inside the inner shells for resisting forces applied to the spliced cables that would tend to separate the spliced cables. The cables to be spliced are passed through a hole in the outer shell, inner shell, and compressible grommets in the inner shells, and space for the cable splices is provided by the extender tube. As the outer shells are threaded onto the extender tube, a seal is formed around the splice by the compression of the grommets and the joining of the inner ends of the inner shells with the ends of the extender tube.

25 Claims, 7 Drawing Sheets

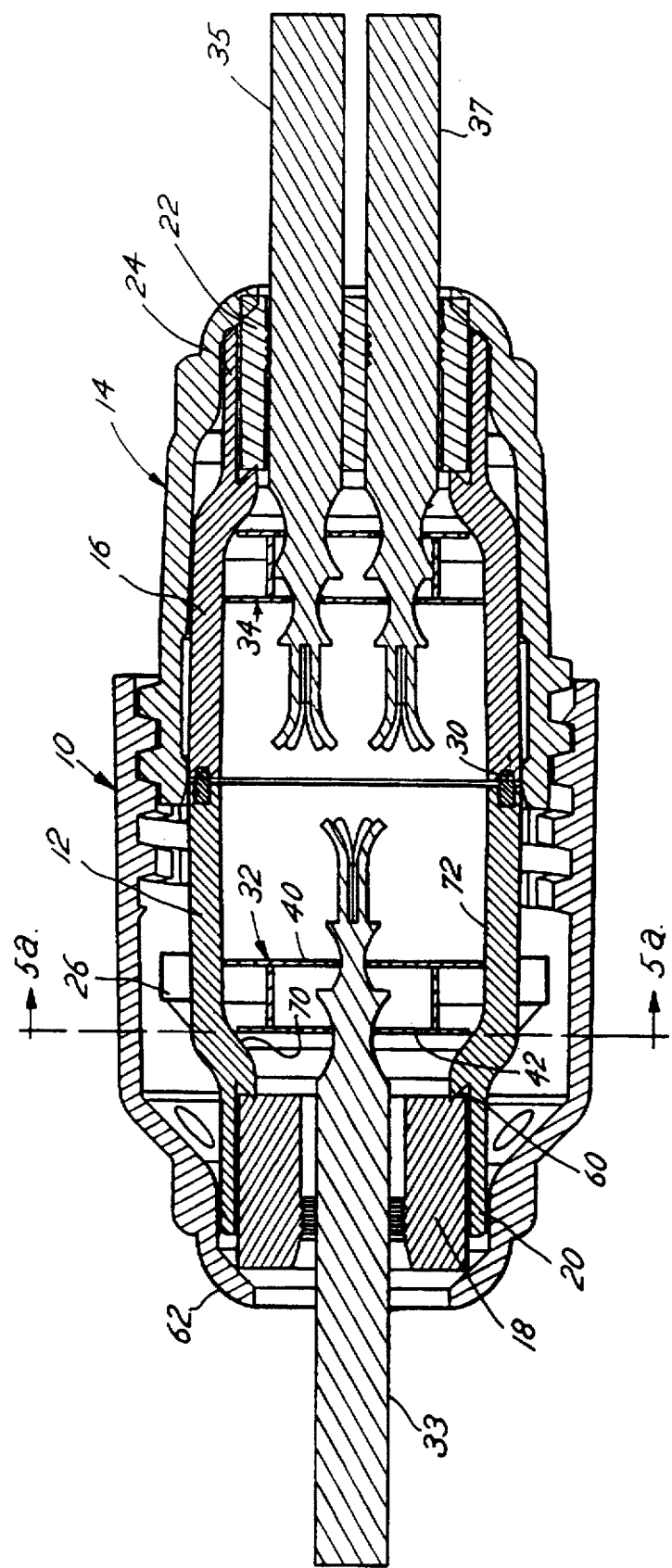

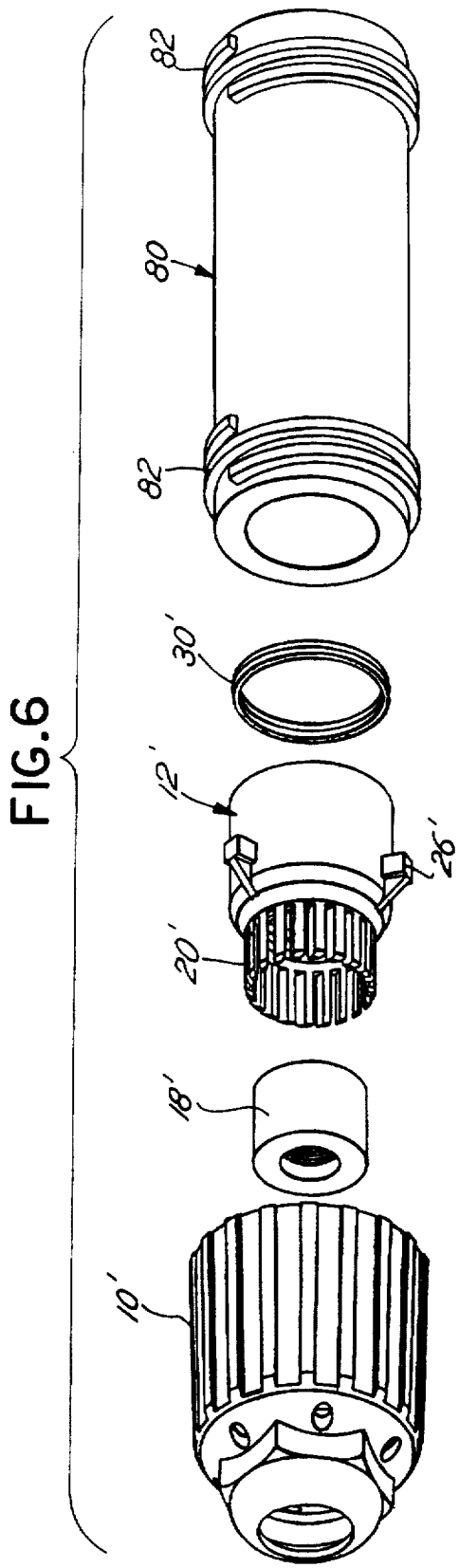

5,760,332

1

CABLE SPLICE PROTECTOR

BACKGROUND OF THE INVENTION

Related Application:

This application is a continuation-in-part of Rocci and Kirby U.S. application Ser. No. 08/335,111, filed Nov. 7, 1994, now U.S. Pat. No. 5,502,280, which is a continuation of U.S. application Ser. No. 08/100,672, filed Jul. 30, 1993, now abandoned.

Field of the Invention:

The present invention relates to cable splice enclosures which are reusable and offer significant advantages over previously known splice enclosures.

In a preferred embodiment of the invention, compressible grommets provide a watertight closure around each cable end, and the enclosure can easily be reopened even long after the initial installation to add or remove cables.

The cable splice enclosure of the present invention may be used with various types of cable such as USE and UF cables. The enclosure can be used for joining any 14 AWG through 250 MCM cable to any other 14 AWG through 250 MCM cable.

The cable splice enclosure of the present invention is advantageous for joining coaxial cables and also telephone cables.

The above-identified parent application resulted in U.S. Pat. No. 5,502,280 which discloses a splice enclosure comprised of a first outer shell 30, a second outer shell 40, a first inner shell 10 and a second inner shell 20. The first inner shell 10 includes a compressible grommet through which one or more cables passes and the second inner shell 20 includes a compressible grommet through which a second one or more cables pass. The ends of the respective cables are spliced, and thereafter the two outer shells are connected at their inner ends such as by threading one outer shell into the outer end of the other outer shell.

The connecting of the two outer shells causes the outer ends of each of the inner shells to be compressed inwardly thereby compressing the respective grommets around the cables passing therethrough. In addition, the connecting of the two outer shells forces the two inner shells into end-to-end abutment to effect a seal between the abutting inner ends of the two inner shells. In addition, as the two outer housings or shells are screwed together, they provide a calibrated amount of compressive force on the two inner shells to allow the installer to provide the desired amount of compression to the splice.

The present invention relates to splice enclosures which include two outer shells and two inner shells as shown in the aforementioned parent case. In one embodiment, the two outer shells and two inner shells and the compressible grommets are the same as in the parent case, but an improvement is added comprising strain relief members, one being mounted inside each of the two inner shells to afford substantial resistance to a pull-out force applied to the two joined cables. Strain relief members are known in the prior art, but it is believed to be novel to utilize such members in the inner shells of a splice enclosure as the present invention.

Another important feature of the present invention comprises an extender in the form of a tube which is connected between the two outer shells. Thus, instead of threading one outer shell onto the opposing outer shell, each of the two outer shells is threaded on an opposite end of an intermediate

2 tubular member on extender. Such extenders may be provided in various lengths and they afford extra room for connectors to be applied to the ends of cable to be spliced. By way of example, certain types of coaxial cable and telephone cable require relatively large joints where they are spliced and the extender members of the present invention will afford the extra space required without loss of any of the advantages of the basic splice enclosure.

The foregoing and other objects and advantages of the invention will be apparent from the following description of certain preferred embodiments thereof, taken in conjunction with the accompanying drawings.

DESCRIPTION OF THE DRAWINGS

FIG. 5 is a longitudinal sectional view taken through the assembly of FIG. 4, but without showing an actual joining or splicing of the ends of the wires;

FIG. 6 is a perspective exploded view of an alternative embodiment of the splice enclosure showing a tubular extender member having external threads at both ends so that each of the two outer shells may be threaded over opposite ends of the extender, the other half of the splice enclosure being the mirror image of the half shown.

Now, in order to acquaint those skilled in the art with the manner of making and using our invention, we shall describe, in conjunction with the accompanying drawings, certain preferred embodiments of our invention.

DETAILED DESCRIPTION OF THE INVENTION

Figure 1:
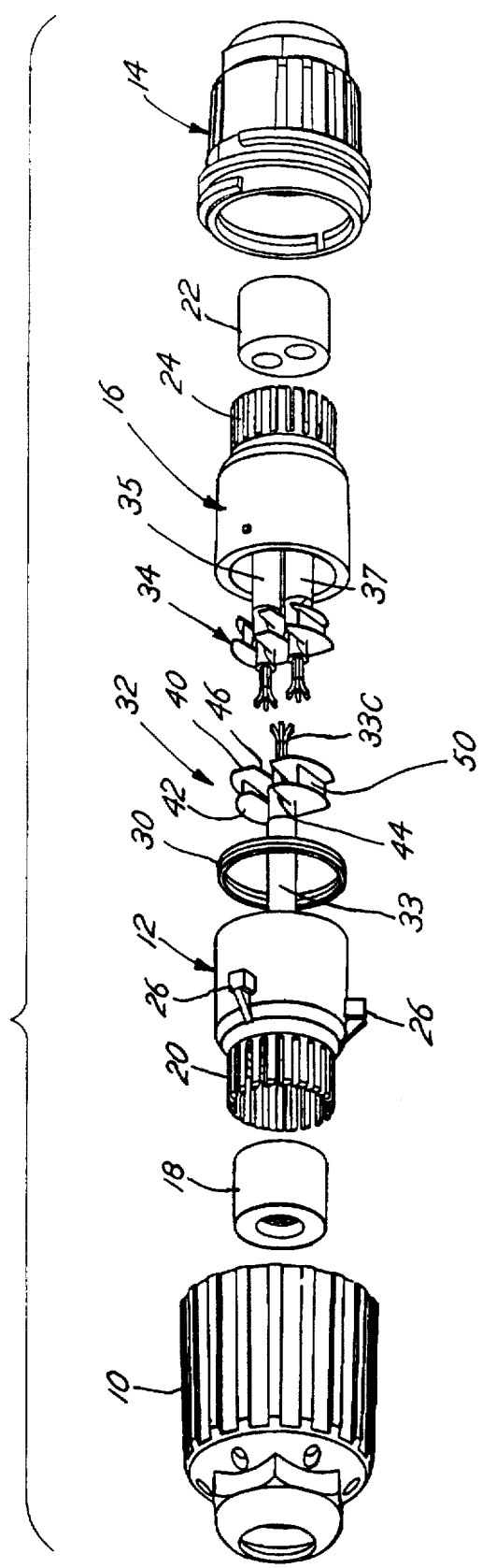
FIG. 1 is a perspective exploded view showing a splice enclosure having two outer shells and two inner shells, each inner shell having a compressive grommet mounted therein having one or more openings for receiving cable, and further showing a pair of strain relief members, one for mounting in each of the inner shells.

FIG. 1 shows an exploded view of a splice enclosure of the type disclosed in the above-identified parent application, except a pair of strain relief members have been added for mounting in the inner shells. There is shown a first outer shell 10, a first inner shell 12, a second outer shell 14 and a second inner shell 16. The first outer shell 10 is larger in diameter than the second outer shell 14 so the second outer shell can be threaded into the first outer shell as shown in FIGS. 4 and 5.

The splice enclosure further includes a first compressible grommet 18 which is mounted in a compressible outer end 20 of first inner shell 12, and a second compressible grommet 22 which is mounted in a compressible outer end 24 of the second inner shell 16. The grommet 18 has a single hole extending therethrough for passing a cable to be spliced, and the grommet 22 has a pair of holes therethrough for passing a pair of cables to be spliced. The number of holes in any particular grommet will vary depending upon the number of cables to be spliced.

As we disclosed in the above-mentioned parent application, the second inner shell 16 fits snugly into the inner end of the second outer shell 14. However, the first inner shell 12 is similar in size to the inner shell 16 and therefor it is smaller than the inner diameter of the larger outer shell 10. As a result, a plurality of projecting guide members 26 are formed on the outer diameter of the first inner shell 12 and the guides 26 are dimensioned to fit snugly into the inner end of first outer shell to aid in locating and mounting the inner shell 12. The inner diameter of the outer shell 10 preferably has longitudinal slots for receiving corresponding guides 26.

Figure 4:
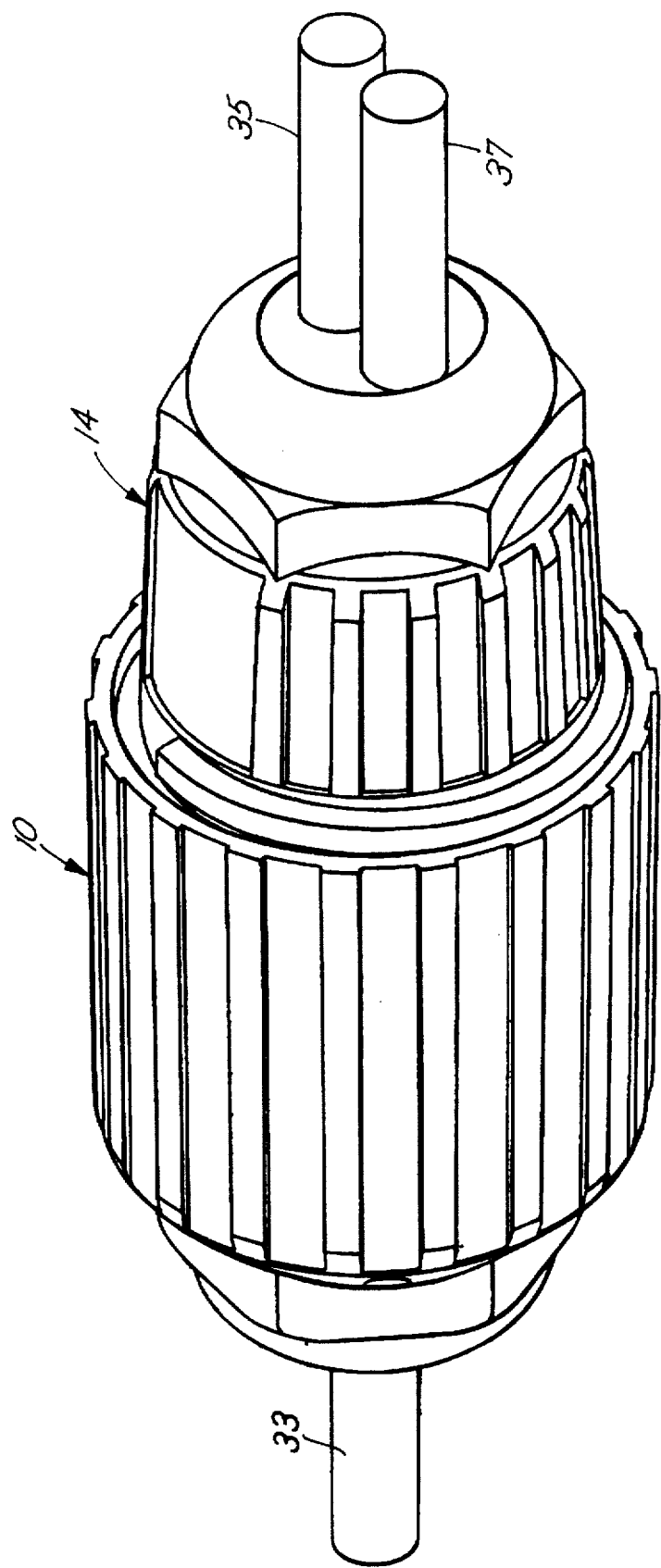
FIG. 4 is a perspective assembly view of the components of FIG. 1 showing one of the outer shell members threaded into an end of the other outer shell member.

FIG. 1 shows an O-ring 30 which is positioned between the abutting inner ends of the inner shells 12 and 16 when the splice enclosure is assembled as shown in FIGS. 4 and 5, the inner shells being held in abutting relation to effect a seal when the components are assembled.

FIG. 1 further shows a pair of strain relief members which are designed to grip and hold the respective cables to provide resistance to a pull-out force applied to the cables. A first strain relief member 32 is designed to accommodate a single cable 33, and a second strain relief member 34 is designed to accommodate a pair of cables 35 and 37.

Figure 3:
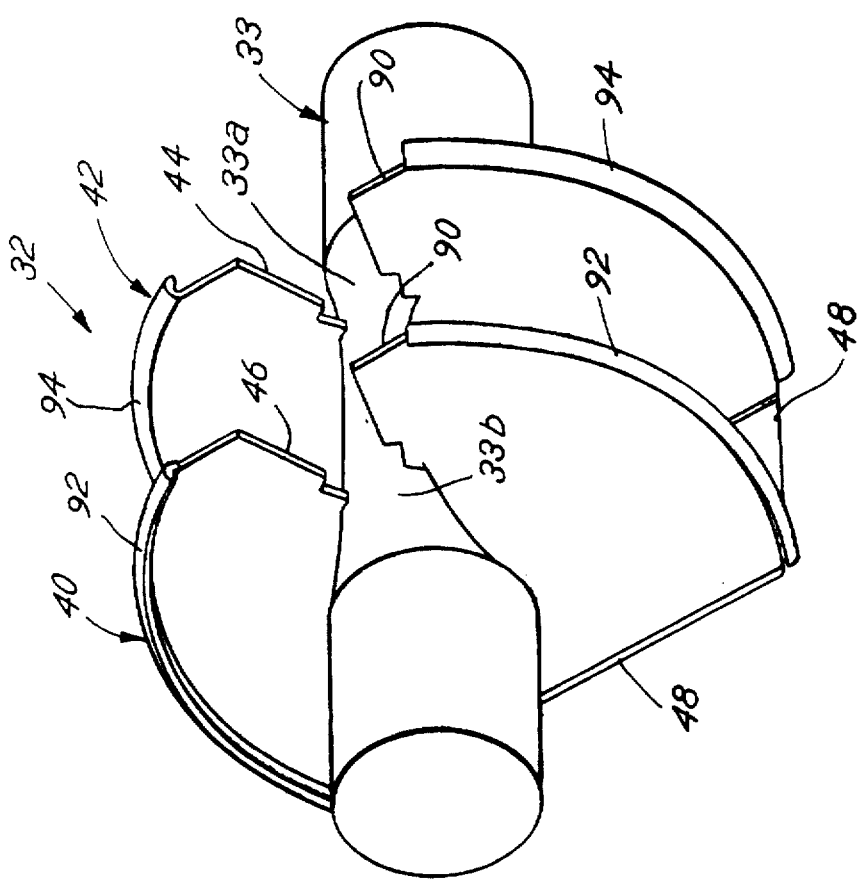
FIG. 3 is an enlarged perspective view of one of the strain relief members showing a single cable passing therethrough, one element of the strain relief member being arranged to receive an outer rubber insulator on the cable and the second element being arranged to receive a copper jacket which surrounds the wires and is enclosed by the rubber insulator.
Figure 2:
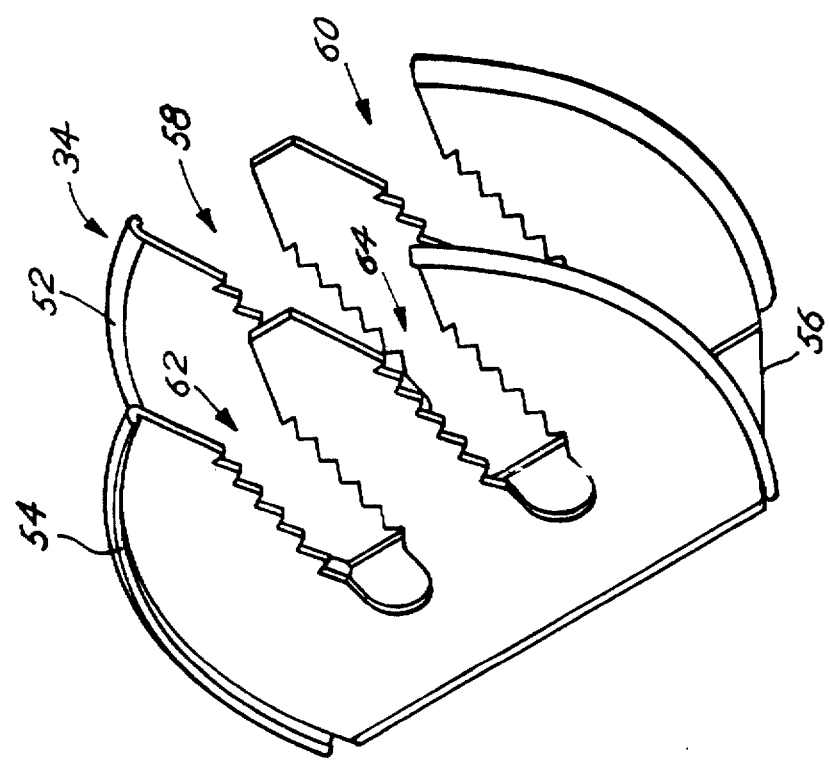
FIG. 2 is an enlarged perspective view of one of the strain relief members.

FIGS. 2 and 3 provide a further showing of the respective strain relief members 32 and 34. The strain relief member 32 shown in FIG. 3 is preferably made of metal and is bent in a generally U-shape to provide a pair of upright, parallel plate portions 40 and 42.

The cable 33 is shown in schematic form in FIG. 3 and comprises an outer rubber insulator 33a which is pressed into a slot 44 in plate 42, and an inner copper jacket 33b which extends from the end of the rubber insulator. Wires to be spliced extend from the copper jacket as shown at 33c in FIG. 1. The copper jacket 33b is pressed into a slot 46 in the second parallel plate 40 as best shown in FIG. 3. The strain relief member has an integral bottom portion as shown at 48.

The slots 44 and 46 in the strain relief member 32 are made with jagged edges or teeth for better gripping of the portions of cable 33 pressed therein. Such jagged edges can penetrate the outer surface of the cable portions pressed into the slots to effect improved gripping and resistance to longitudinal pull-out.

The slot 46 in the plate 40 will normally be made narrower than the slot 44 in the plate 42 because the inner slot 46 is intended to receive the copper jacket 33b which is smaller in diameter than the outer rubber insulator 33a which is received in the outer slot 44. Also, the inner plate 40 is of reduced height compared to the outer plate 42 so that both plates will fit snugly into the inner diameter of the inner end of first inner shell 12 as shown in FIG. 5.

FIG. 1 shows a pair of sidewalls 50 on the strain relief member 32 which are simply bent-up portions of the bottom wall 48. Such optional sidewalls 50 are not shown in FIGS. 2 and 3.

FIG. 2 shows the second strain relief member 34 which is the same structure as the strain relief member 32 except it is provided with two slots in each plate to receive and grip a pair of cables 35 and 37. The strain relief member 34 includes a pair of parallel walls 52 and 54 with an integral bottom 56, and each wall has a pair of slots formed therein. The wall 52 has slots 58 and 60 formed therein, and the wall 54 has slots 62 and 64 formed therein.

For the particular application being described, one of the walls 52 and 54 will be smaller than the other so it can fit snugly within a smaller interior portion of the inner shell 16, and also the slots in one of the plates 52 and 54 will be larger than the slots in the other plate because the rubber insulator portion of the cable is larger than the copper jacket portion.

It is believed to be known in the art to provide strain relief members having parallel plates with slots for gripping respective portions of a cable to resist pullout forces on the cable. However, it is believed to be novel with the present invention to provide such strain relief members which fit snugly within inner shells such as the shells 12 and 16 to resist pullout forces on cable which passes through those shells for purposes of splicing within a splice enclosure.

Reference is now made to FIGS. 4 and 5 to describe the components of FIG. 1 in their assembled form. FIGS. 4 and 5 show all of the components assembled within the respective outer shells 10 and 14, and they show the outer shell 14 threaded into the outer shell 10 in fully assembled form to provide a sealed enclosure for a spliced group of cables. FIG. 5 does not actually show a splice member for splicing the single cable 33 with the pair of cables 35 and 37, but in actual practice a splice member will be used to splice the respective cables prior to threading of the outer shell 14 into the outer shell 10.

FIG. 5 shows the compressible grommet 18 which is pressed into the outer end of the inner shell 12 until it rests against an annular ledge 60 which supports the grommet. The outer end of the grommet 18 projects beyond the outer end of the inner shell 12 with the result that an inclined outer end portion 62 of the outer shell 10 engages the outer end of the grommet and biases it inwardly against the annular ledge 60. Also, the compressible outer end 20 of the inner shell 12 is compressed by the interior of the outer shell 10 thereby compressing the grommet 18 around the cable 33 to effect a tight seal.

The inner shells and grommets are shown in different positions in FIG. 5 for illustrative purposes only. On the right end of the enclosure, the outer compressible end 24 is shown fully inserted into the outer shell 14 so as to be compressed, thereby compressing the grommet 22 around the cables 35 and 35. In contrast, the left portion of the drawing does not show the outer end 20 of the inner shell 12 fully inserted into the outer shell 10, with the result that the compressible outer end 20 of the inner shell 10 is not yet fully compressed and thus the grommet 18 is not yet fully compressed about cable 33.

When the outer shell 10 is threaded further over the outer shell 14 to achieve the desired abutting forces at the abutting inner ends of the inner shells 12 and 16, the outer end 20 of the inner shell 12 will be fully inserted into outer shell 10 thereby compressing the compressible outer end 20 and compressing grommet 18 about cable 33. The fully sealed position is illustrated in FIG. 10 of the aforementioned U.S. Pat. No. 5,502,280. In the foregoing respect, FIG. 5 does not show an actual condition because normally both ends will be in the same state of compression.

Still referring to FIG. 5, the strain relief member 32 is mounted inside the inner shell 12 so that its outer plate 42 rests against an inclined portion which defines an annular ledge 70. While it is not visible in the drawing, there is preferably a slight taper in the inner wall 72 of the inner shell so that the diameter reduces slightly from the inner end of the shell 12 to the annular ledge 70. Moreover, the plate 42 and the plate 40 are dimensioned so that they preferably engage the inside of the inner shell 12 simultaneously as the strain relief member with the cable 33 attached thereto is inserted into the inner end thereof. In the foregoing manner, the strain relief member 32 is firmly seated in the inner shell 12 to resist any pull-out force applied to the cable 33.

As shown in FIG. 5, the strain relief member 34 is seated in the inner shell 16 in the same manner described above with respect to the strain relief member 32. The only difference between the two strain relief members is that the member 34 has two slots in each of the plates 52 and 54 (see FIG. 2) in order to accommodate two cables.

Figure 5A:
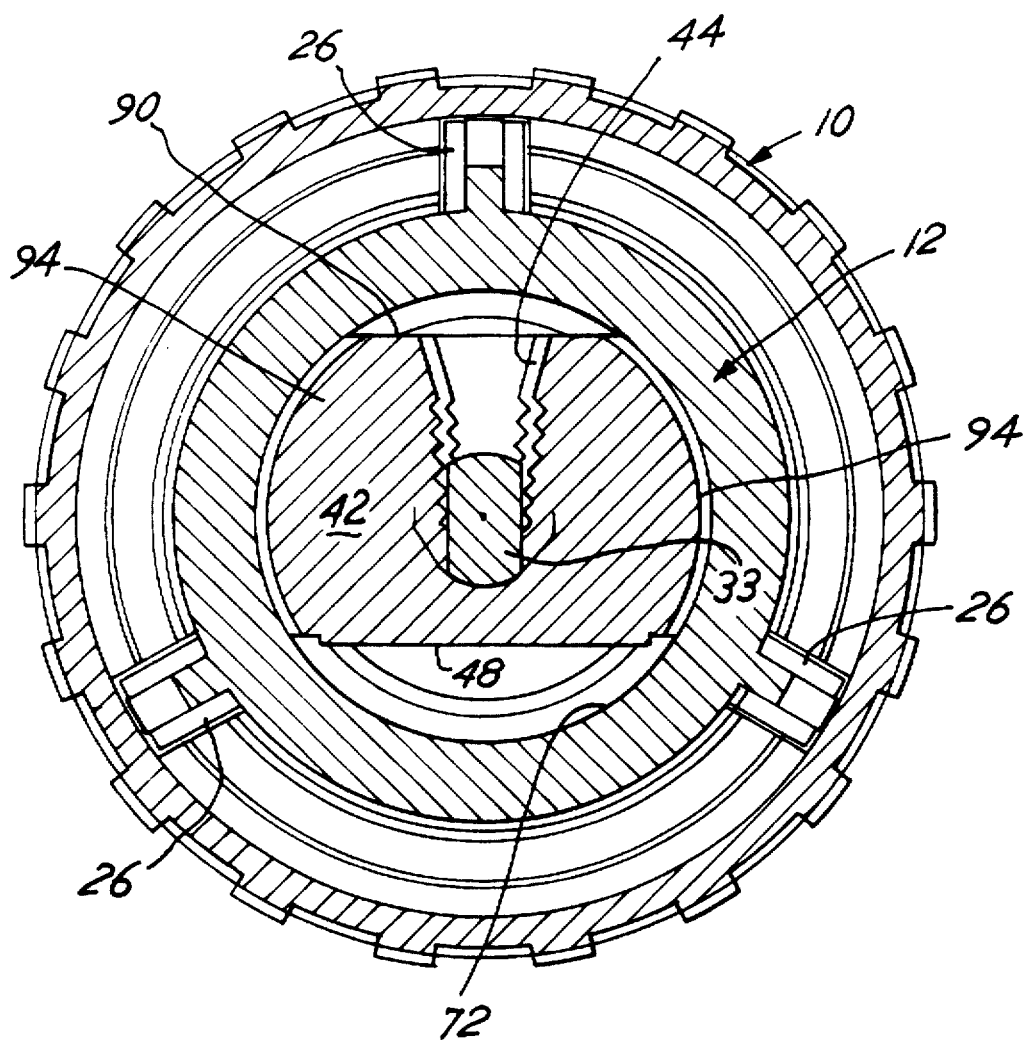
FIG. 5a is a cross-sectional view taken along the line 5a—5a of FIG. 5.

FIG. 5a is a cross-sectional view taken along the line 5a—5a of FIG. 5 and it illustrates the manner in which the strain relief member 32 fits within the inside of the inner shell 12.

As previously described in connection with FIG. 3, the strain relief member 32 is made from a metal stamping which is bent into a U-shape to provide a bottom 48 and two parallel plate portions 40 and 42. In the preferred embodiment shown in FIG. 3, the bottom of the strain relief member 32 is flat, the top is flat but is of course interrupted by the slots, and the sides are arcuate. Such a member will fit snugly within the cylindrical inside of the inner shell 12 as shown in FIG. 5a.

FIG. 3 shows flat bottom 48, a flat top 90 which is defined by the top edges of the plates 40 and 42, and the arcuate sides 92 of plate 40 and arcuate sides 94 of plate 42.

FIG. 5a shows how a strain relief member having the foregoing configuration will fit snugly within the inner diameter 72 of the inner shell 12. The flat top 90 and the flat bottom 48 of the strain relief member 32 are spaced from the cylindrical interior wall 72 of the inner shell 12, while the arcuate side walls 94 of the plate 42 fit snugly against the interior cylindrical wall 72 of the inner shell 12. It will be understood that the other plate member 40, while larger than the plate 42 as shown in FIG. 5, will fit snugly within the cylindrical interior of the inner shell 12 in the same manner as the first plate 42. Also, as previously mentioned, the strain relief member 32 is mounted within the inner shell 12 in a manner to resist a pull-out force applied thereto, due primarily to the annular ledge 70 against which the plate 42 is seated.

The action of the ledge 70 on the outer diameter of the arcuate sides 94 of plate 42 (see FIGS. 5 and 5a) may be utilized to achieve compression or closing of the slot 44 around the cable 33 to further increase the resistance to a pull-out force. The same is true with respect to the plate 40, except that the taper of the wall 72 in the area of the plate 40 is not very significant in the illustrated embodiment, so less compression would be achieved. The point is that when the strain relief members are shaped and mounted as described herein, it is possible to achieve squeezing of the outer arcuate walls to compress the slots and in that manner increase resistance to pull-out forces.

Figure 7:
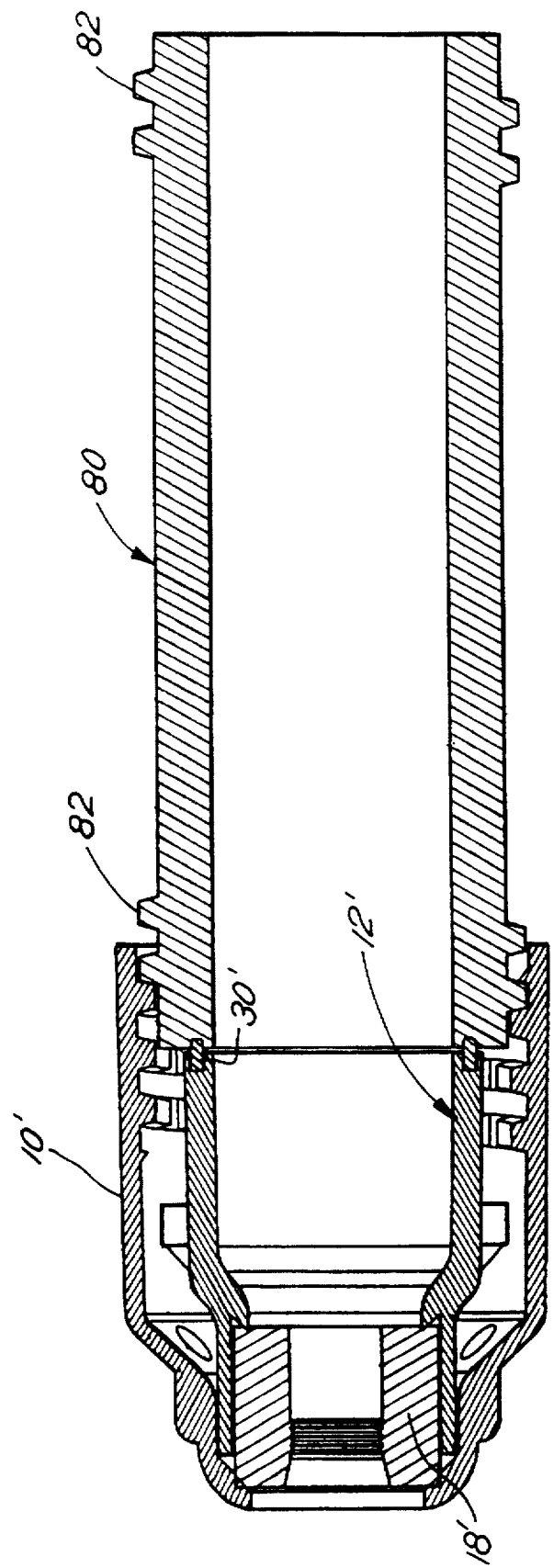
FIG. 7 is a longitudinal sectional view taken through an assembly of the components shown in FIG. 6.

Reference is now made to FIGS. 6 and 7 which show an extender which is mounted between two outer shells. FIGS. 6 and 7 show two outer shells 10', two inner shells 12', two compressible grommets 18' and two O-rings 30'. Each inner shell 12' has a compressible outer end 20', and projecting guides 26' are shown on the outside of each inner shell 12'. An extender 80 comprises an elongated tubular member with external threads 82 at each end thereof.

As shown in FIG. 7, the grommets 18' are mounted in the inner shells 12', and the inner shells are mounted in the outer shells 10', all as previously described. However, in this instance neither of the outer shells 10' threads over an opposing outer shell. Instead, a first outer shell 10' threads over one end of the extender tube 80, and a second outer shell 10' threads over the opposite end of the extender tube 80.

The extender 80 in its preferred embodiment is a tubular member having a constant inside and outside diameter. The extender may be provided in different lengths to provide a desired amount of space for a splicing member to effect splicing of cables which enter into the extender from the opposed outer shells. Of course, splicing of such cables must be achieved before the second of the two outer shells is threaded onto an end of the extender.

In the foregoing embodiment, the two inner shells do not abut one another as in the prior embodiment. However, two O-rings as shown at 30' in FIGS. 6 and 7 create seals between the inner ends of both inner shells 12' and both ends of the extender 80 so that an effective seal is provided as in the prior embodiment.

As previously explained, each strain relief member 32 and 34 has its innermost plate formed with a slot dimensioned to receive and grip a copper jacket which surrounds the wires of the cable. Where desirable, one need only connect a conductive wire between the two strain relief members in order to create a conductive path between the copper jackets of two opposing cables to be spliced. By welding such a wire between the strain relief members, the two copper jackets will in effect be made continuous, which can afford advantages in certain cases as when lightning is present.

The main advantage of the strain relief members 32 and 34 is to provide resistance to a pull-out force applied to the spliced cables. By way of example, such splice enclosures are commonly subjected to a pull-out test where a 35 pound force is applied to the cables, which means that a pull-out force is applied to the outer rubber insulator portion of the cable. If the strain relief members 32 and 34 were not utilized, resistance to such a pull-out force would be created by the rubber grommets as shown at 18 and 22 in FIG. 1, but such grommets are not designed to provide effective resistance to pull-out forces. The strain relief members of the present invention are unusually effective because each is seated against an annular ledge portion inside of its respective inner shell, and each has slots with a series of gripping teeth which firmly grip the rubber insulator and the copper jacket therein.

It is important that the foregoing advantages are achieved without need for any encapsulation of the splice enclosure. The present invention is suitable for splicing of UF (electrical) wire and USE (underground) wire as well as Conex wire, telephone wire, coaxial cable and fiber optics. For example, the splicing or termination of fiber optic conductors requires a large tray where the wire is wound around the tray to avoid sharp bending. An extender tube as shown in FIGS. 6 and 7 will provide the space necessary to accommodate such a tray. The extender is particularly advantageous when splicing coaxial cable and fiber optics.

In the use of the present invention, an installer need only splice the conductors to be enclosed and then thread one of the outer shells onto the other outer shell or thread two outer shells onto opposite ends of an extender tube and by controlled twisting of such outer shells a desired amount of compression can be achieved to provide a water-tight enclosure for the splice. The shell members may be made of engineering grade, polymer-based material which resists moisture, petroleum based products, chemicals and rodents. There is no mixing of compounds, laborious taping, messy gels or dangerous "heat shrinking" flames.

What is claimed is:

1. A cable splice enclosure comprising, in combination, a first inner shell having a first inner end and a first outer end, a second inner shell having a second inner end and a second outer end, a first outer shell having a first inner end and a first outer end, a second outer shell having a second inner end and a second outer end, said first outer shell being mounted over said first inner shell to receive the latter, said second outer shell being mounted over said second inner shell to receive the latter, an extender positioned between said first and second outer shells and having connecting means at both ends for connecting to said inner ends of said outer shells, said first outer shell connected to one of said ends of said extender and said second outer shell being connected to another of said ends of said extender, each of said inner shells being held by each of said outer shells and having an end-to-end abutting relationship with said ends of said extender, whereby said first and second outer shells and said extender form an enclosure.

2. A cable splice enclosure as defined in claim 1 where said extender has external threads formed on said ends thereof and said first and second outer shells are threaded on said ends of said extender.

3. A cable splice enclosure as defined in claim 1 where said extender is in the form of a straight tube.

4. A cable splice enclosure as defined in claim 1 where said shells and said extender are made of polymer-based material.

5. A cable splice enclosure as defined in claim 1 where an O-ring is positioned between the inner end of each of said inner shells and each of said ends extender.

6. A cable splice enclosure as defined in claim 1 where each of said inner shells has a plurality of guides formed on the outside thereof, such that said guides fit substantially snugly in the inner diameter of each of said outer shells.

7. A cable splice enclosure as defined in claim 1 including a first compressible grommet mounted in said outer end of said first inner shell and having at least one opening for receiving a first cable therethrough, a second grommet mounted in said outer end of said second inner shell and having at least one opening for receiving a second cable therethrough, whereby said first and second cables may be passed through said inner shells and one of said cables may be passed through said extender, and said cables then being spliced, said outer shells both being secured to said ends of said extender whereby said extender affords space for accommodating said splice.

8. A cable splice enclosure as defined in claim 1 where the inside diameter of said inner ends of said first and second inner shells is substantially equal to the inside diameter of said extender.

9. A cable splice enclosure as defined in claim 1 where said first and second outer shells are substantially identical to one another and said first and second inner shells are substantially identical to one another.

10. A cable splice enclosure as defined in claim 2 where the inner ends of each of said outer shells extend beyond the inner ends of said inner shells mounted therein and the extending inner ends of said outer shells having internal threads formed therein.

11. A cable splice enclosure comprising, in combination, a first inner shell having a first inner end and a first outer end, a second inner shell having a second inner end and a second outer end, a first outer shell having a first inner end and a first outer end, a second outer shell having a second inner end and a second outer end, said first outer shell being mounted over said first inner shell to receive the latter, said second outer shell being mounted over said second inner shell to receive the latter, the inner ends of each of said outer shells extending beyond the inner ends of said inner shells mounted therein and the extending inner ends of said outer shells having internal threads formed therein, an extender positioned between said first and second outer shells and having external threads at both ends for threaded connection to said inner ends of corresponding ones of said outer shells, said first outer shell being threaded to one of said ends of said extender and said second outer shell being threaded to another of said ends of said extender, whereby said first and second outer shells and said extender form an enclosure, said inner ends of said inner shells being held by said outer shells and having an end-to-end abutting relationship with said ends of said extender, and the inside diameter of said inner ends of said first and second inner shells is substantially equal to the inside diameter of said extender.

12. A cable splice enclosure as defined in claim 11 where said extender is in the form of a straight tube.

13. A cable splice enclosure as defined in claim 11 where said shells and said extender are made of polymer-based material.

14. A cable splice enclosure as defined in claim 11 where an O-ring is positioned between the inner end of each of said inner shells and each of said ends extender.

15. A cable splice enclosure as defined in claim 11 where each of said inner shells has a plurality of guides formed on the outside thereof, such that said guides fit substantially snugly in the inner diameter of each of said outer shells.

16. A cable splice enclosure as defined in claim 11 including a first compressible grommet mounted in said outer end of said first inner shell and having at least one opening for receiving a first cable therethrough, a second compressible grommet mounted in said outer end of said second inner shell and having at least one opening for receiving a second cable therethrough, whereby said first and second cables may be passed through said extender, said cables then being spliced, and said outer shells both being secured to said ends of said extender whereby said extender affords space for accommodating said splice.

17. A cable splice enclosure as defined in claim 11 where said first and second outer shells are substantially identical to one another and said first and second inner shells are substantially identical to one another.

18. A cable splice enclosure comprising, in combination, a first inner shell having a first inner end and a first outer end, a second inner shell having a second inner end and a second outer end, a first outer shell having a first inner end and a first outer end, a second outer shell having a second inner end and a second outer end, said first outer shell being mounted over said first inner shell to enclose the latter, said second outer shell being mounted over said second inner shell to enclose the latter, said first inner and outer shells each having a central opening to permit a first cable to enter said first inner shell from said outer end thereof, said second inner and outer shells each having a center opening to permit a second cable to enter said second inner shell from said outer end thereof, whereby ends of said first and second cables may be spliced, and a pair of strain relief members, one mounted inside each of said inner shells, each of said strain relief members being dimensioned to fit relatively snugly in a corresponding one of said shells in a manner to resist movement in an outward direction, and each of said strain relief members having means for receiving and gripping one of said cables passing through one of said inner shells to resist a pull-out force applied to said one cable.

19. A cable splice enclosure as defined in claim 18 where each of said strain relief members has at least one slot for receiving and gripping one of said cables passing therethrough.

20. A cable splice enclosure as defined in claim 18 where each of said strain relief members is inserted into a corresponding one of said inner shells from said inner end thereof and is seated against an annular ledge formed inside said one inner shell to prevent said strain relief member from moving outwardly from its seated position.

21. A cable splice enclosure as defined in claim 18 where each of said strain relief members is made of metal which is bent to form a pair of upstanding parallel plates, each of said plates having a slot for receiving and gripping one of said cables.

22. A cable splice enclosure comprising, in combination, a first inner shell having a first inner end and a first outer end, a second inner shell having a second inner end and a second outer end, a first outer shell having a first inner end and a first outer end, a second outer shell having a second inner end and a second outer end, said first outer shell being mounted over said first inner shell to enclose the latter, said second outer shell being mounted over said second inner shell to enclose the latter, said first inner and outer shells each having a central opening to permit a first cable to enter said first inner shell from said outer end thereof, said second inner and outer shells each having a central opening to permit a second cable to enter said second inner shell from said outer end thereof, whereby ends of said first and second cables may be spliced, and a pair of strain relief members, each of said strain relief members being made of metal which is bent to form a pair of upstanding parallel plates, each of said plates having a slot for receiving and gripping a portion of one of said cables passing through one of said inner shells, and each of said strain relief members being inserted into a corresponding one of said inner shells from said inner end thereof and seated against an annular ledge formed in said one inner shell to prevent said strain relief member from moving outwardly from its seated position and thereby resisting a pull-out force applied to said one cable.

23. A cable splice enclosure as defined in claim 22 where said parallel plates of said strain relief members comprise an outwardly disposed plate which is seated against said annular ledge and an inwardly disposed plate which is larger than said outwardly disposed plate.

24. A cable splice enclosure as defined in claim 23 where said slot in said outwardly disposed plate is larger than said slot in said inwardly disposed plate to receive and grip a larger diameter portion of said one cable.

25. A cable splice enclosure as defined in claim 22 where each of said strain relief members has a generally flat bottom and opposed arcuate sides, and where each of said strain relief members fits relatively snugly into a cylindrical interior of a corresponding one of said inner shells with only said arcuate sides in engagement with said interior of said one inner shell.

* * * * *